US010813451B2

(12) United States Patent
Hill et al.

(10) Patent No.: US 10,813,451 B2
(45) Date of Patent: Oct. 27, 2020

(54) MOBILE DEVICE STAND

(71) Applicant: Hypnap LLC, Waltham, MA (US)

(72) Inventors: Chloe Hill, Waltham, MA (US); HyukJae Henry Yoo, Leonia, NJ (US); John Lonczak, Newburgh, NY (US)

(73) Assignee: Hypnap LLC, Waltham, MA (US)

( * ) Notice: Subject to any disclaimer, the term of this patent is extended or adjusted under 35 U.S.C. 154(b) by 18 days.

(21) Appl. No.: 16/138,154

(22) Filed: Sep. 21, 2018

(65) Prior Publication Data

US 2019/0038018 A1 Feb. 7, 2019

Related U.S. Application Data

(63) Continuation-in-part of application No. 15/467,130, filed on Mar. 23, 2017, now Pat. No. 10,226,130, (Continued)

(51) Int. Cl.
| | |
|---|---|
| A47B 23/04 | (2006.01) |
| F16M 13/02 | (2006.01) |
| F16B 2/12 | (2006.01) |
| A47C 7/38 | (2006.01) |
| B60N 3/00 | (2006.01) |
| B60N 2/882 | (2018.01) |

(52) U.S. Cl.
CPC ............ *A47B 23/043* (2013.01); *A47C 7/383* (2013.01); *B60N 2/882* (2018.02); *B60N 3/001* (2013.01); *F16B 2/12* (2013.01); *F16M 13/022* (2013.01); *A47B 2200/0085* (2013.01)

(58) Field of Classification Search
CPC ... A47B 23/043; E05B 73/0082; F16M 11/24; F16M 11/38
See application file for complete search history.

(56) References Cited

U.S. PATENT DOCUMENTS

| 456,089 | A | * | 7/1891 | Harrison | .............. A47B 23/042 |
| | | | | | 248/452 |
| 4,436,271 | A | * | 3/1984 | Manso | ................... A47B 19/00 |
| | | | | | 248/452 |

(Continued)

FOREIGN PATENT DOCUMENTS

| DE | 29802573 U1 * | 6/1998 | .............. B44D 3/00 |
| DE | 102016101331 A1 * | 7/2017 | ............. F16M 13/00 |

(Continued)

*Primary Examiner* — Eret C McNichols
(74) *Attorney, Agent, or Firm* — Intrinsic Law Corp.

(57) ABSTRACT

An apparatus for supporting a mobile device is collapsible and configurable in multiple degrees of freedom. The apparatus includes a mobile device support body, a base, a stand, a support arm, and a clamp. The stand is pivotably and/or rotatably coupled to the mobile device support body and pivotably coupled to the base. The support arm is releasably coupled to the stand and pivotably coupled to the base. The clamp is slidingly coupled to the base. The size of the mobile device support body is adjustable to receive a mobile device having different sizes and orientations. The length of the stand and the support arm can be adjusted to set a height and an angle of the mobile device support body. The mobile device support body can be rotatable to allow the mobile device support body to face backwards.

14 Claims, 14 Drawing Sheets

Related U.S. Application Data which is a continuation-in-part of application No. 14/680,864, filed on Apr. 7, 2015, now Pat. No. 9,637,031.

(60) Provisional application No. 61/976,563, filed on Apr. 8, 2014, provisional application No. 62/127,612, filed on Mar. 3, 2015, provisional application No. 62/561,998, filed on Sep. 22, 2017, provisional application No. 62/398,660, filed on Sep. 23, 2016.

(56) References Cited

U.S. PATENT DOCUMENTS

| | | | | |
|---|---|---|---|---|
| 4,802,708 A * | 2/1989 | Vos | ............ | B63B 29/04 114/363 |
| 5,123,621 A * | 6/1992 | Gates | ............ | F16M 11/2014 248/184.1 |
| 5,330,147 A * | 7/1994 | Volcheff | ............ | A47B 21/0314 248/231.41 |
| 5,769,369 A * | 6/1998 | Meinel | ............ | B60N 3/001 248/176.1 |
| 5,797,578 A * | 8/1998 | Graffeo | ............ | A47B 23/043 248/453 |
| 7,364,129 B1 * | 4/2008 | Levari, Jr. | ............ | A45C 13/00 108/4 |
| 7,669,812 B2 * | 3/2010 | Yun | ............ | F16M 11/10 248/162.1 |
| 7,922,137 B2 * | 4/2011 | Derry | ............ | A47B 21/0314 248/178.1 |
| 8,074,951 B2 * | 12/2011 | Carnevali | ............ | B60R 11/02 108/143 |
| 8,387,930 B2 * | 3/2013 | Drew | ............ | F16M 11/046 248/157 |
| 8,413,943 B1 * | 4/2013 | Li | ............ | F16M 11/041 248/292.12 |
| 8,469,325 B2 * | 6/2013 | Yu | ............ | G10G 5/005 248/231.51 |
| 8,763,969 B2 * | 7/2014 | Wu | ............ | F16M 11/10 248/123.11 |
| 8,814,128 B2 * | 8/2014 | Trinh | ............ | A47F 7/024 248/187.1 |
| 8,925,877 B2 * | 1/2015 | Carnevali | ............ | B60R 11/0252 248/122.1 |
| 9,145,158 B2 * | 9/2015 | Cruz | ............ | F16M 11/041 |
| 9,198,507 B1 * | 12/2015 | Lau | ............ | A47B 97/08 |
| 9,448,588 B2 * | 9/2016 | Barnard | ............ | G06F 1/1626 |
| 9,568,141 B1 * | 2/2017 | Zaloom | ............ | F16M 11/12 |
| 9,578,979 B1 * | 2/2017 | Zeuch | ............ | A47G 1/164 |
| 9,634,519 B2 * | 4/2017 | King | ............ | H02J 7/35 |
| 9,695,849 B2 * | 7/2017 | Zhou | ............ | F16B 2/12 |
| 9,898,042 B2 * | 2/2018 | Abbott | ............ | G06F 1/1632 |
| 10,208,777 B1 * | 2/2019 | Brassard | ............ | F16M 11/041 |
| 10,322,764 B2 * | 6/2019 | Thomas | ............ | F16M 13/022 |
| 10,426,261 B2 * | 10/2019 | Theis | ............ | F16M 11/041 |
| 2003/0164010 A1 * | 9/2003 | Galant | ............ | E05B 70/58 |
| 2009/0308990 A1 * | 12/2009 | Yen | ............ | F16M 11/105 248/121 |
| 2012/0074272 A1 * | 3/2012 | Hull | ............ | F16M 11/041 248/122.1 |
| 2012/0119040 A1 * | 5/2012 | Ergun | ............ | A47B 21/02 248/126 |
| 2013/0092805 A1 * | 4/2013 | Funk | ............ | F16M 13/02 248/121 |
| 2014/0097306 A1 * | 4/2014 | Hale | ............ | G03B 17/566 248/122.1 |
| 2014/0328020 A1 * | 11/2014 | Galant | ............ | F16M 11/105 361/679.56 |
| 2015/0001905 A1 * | 1/2015 | Jackow | ............ | B60N 2/882 297/397 |
| 2015/0034778 A1 * | 2/2015 | Lin | ............ | G06F 1/1613 248/124.1 |
| 2015/0267863 A1 * | 9/2015 | Chang | ............ | A45B 3/00 248/333 |
| 2015/0282628 A1 * | 10/2015 | Hill | ............ | A47C 7/383 297/391 |
| 2015/0336495 A1 * | 11/2015 | Maslakow | ............ | B60N 3/00 224/401 |
| 2016/0108942 A1 * | 4/2016 | Yu | ............ | F16M 13/00 248/316.4 |
| 2016/0201359 A1 * | 7/2016 | Berglund | ............ | A47F 7/0246 70/58 |
| 2016/0312950 A1 * | 10/2016 | Bowman | ............ | F16M 11/14 |
| 2017/0188715 A1 * | 7/2017 | Hill | ............ | B60N 2/882 |
| 2018/0020825 A1 * | 1/2018 | Hung | ............ | A47B 21/02 108/31 |
| 2019/0159601 A1 * | 5/2019 | Hill | ............ | A47C 16/00 |
| 2019/0187754 A1 * | 6/2019 | Janzen | ............ | F16M 11/041 |
| 2019/0301665 A1 * | 10/2019 | Wu | ............ | G06F 21/88 |
| 2019/0365092 A1 * | 12/2019 | Zhang | ............ | A47B 23/043 |
| 2019/0376639 A1 * | 12/2019 | Bowman | ............ | F16M 11/10 |
| 2020/0025327 A1 * | 1/2020 | Angsutrarux | ............ | F16M 11/38 |

FOREIGN PATENT DOCUMENTS

| | | | | |
|---|---|---|---|---|
| EP | 3076266 A1 * | 10/2016 | ......... | E05B 73/0082 |
| GB | 2569201 A * | 6/2019 | ......... | F16M 13/00 |

* cited by examiner

MOBILE DEVICE STAND

CROSS-REFERENCE TO RELATED APPLICATIONS

This application is a continuation-in-part of U.S. patent application Ser. No. 15/467,130, filed on Mar. 23, 2017, titled "Bodyrest," which is a continuation-in-part of U.S. patent application Ser. No. 14/680,864, now U.S. Pat. No. 9,637,031, filed on Apr. 7, 2015, titled "Bodyrest," which claims priority to U.S. Provisional Application No. 61/976,563, titled "Headrest," filed on Apr. 8, 2014, and to U.S. Provisional Application No. 62/127,612, titled "Bodyrest," filed on Mar. 3, 2015. This application claims also priority to U.S. Provisional Application No. 62/561,998, titled "Mobile Device Stand," filed on Sep. 22, 2017. In addition, U.S. patent application Ser. No. 15/467,130 claims priority to U.S. Provisional Application No. 62/398,660, titled "Mobile Device Stand," filed on Sep. 23, 2016. The disclosures of each of the foregoing applications are hereby incorporated by reference.

TECHNICAL FIELD

This application generally relates to apparatuses for supporting mobile devices.

BACKGROUND

Current portable device stands only provide limited adjustability and customization. Many portable device stands are uncomfortable to use, for example because the mobile device is held in an uncomfortable position and the user cannot adjust the stand.

The use of mobile devices has led to a new major health problem called "text neck" which is caused by bending one's head down to view cellphones, tablets and laptops. The muscles and nerves of the neck are only meant to handle 10-12 pounds, the weight of the neck when maintaining a neutral position facing forward. Bending the head 15 degrees to view a mobile device adds 27 pounds of stress to the neck, at 30 degrees it adds 49 pounds of stress to the neck, and at 45 degrees it adds 60 pounds of stress to the neck. Over time, this stress on the neck, shoulders, and back leads to chronic pain and in some cases surgery.

Dermatologists caution that looking down at one's mobile device for extensive periods can also lead to premature aging. Gazing downwards hastens the impact of gravity and the loss of the skin's elasticity, creating and exaggerating wrinkles and sagging jowls.

There currently is no mobile device stand that allows you to adjust a mobile device to eye level that is also highly compact and portable.

SUMMARY

Example embodiments described herein have innovative features, no single one of which is indispensable or solely responsible for their desirable attributes. The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Without limiting the scope of the claims, some of the advantageous features will now be summarized. Other objects, advantages and novel features of the disclosure will be set forth in the following detailed description of the disclosure when considered in conjunction with the drawings, which are intended to illustrate, not limit, the invention.

An aspect of the invention is directed to an apparatus for supporting a mobile device, comprising: a mobile device support body; a base; a telescoping stand having a stand axis that extends between first and second ends of the telescoping stand, the first end mechanically coupled to the mobile device support body, the second end pivotably attached to the base, wherein a length of the telescoping stand is adjustable to set a height of the mobile device support body with respect to a user; a telescoping support arm having first and second ends, the first end of the telescoping support arm mechanically coupled to the telescoping stand, the second end pivotably attached to the base, wherein a length of the telescoping support arm is adjustable to pivot the telescoping stand towards or away from the user; a clamp that receives an edge of a table, the clamp slideably coupled to the base, wherein a position of the base is adjustable relative to the clamp along a base axis such that the base can adjustably move towards or away from the user while the clamp is disposed on the edge of the table.

In one or more embodiments, the apparatus further comprises a plurality of hooks disposed on the mobile device support body to receive the mobile device. In one or more embodiments, the apparatus further comprises a plurality of pads, each pad attached to an inner surface of a respective hook. In one or more embodiments, the mobile device support body includes upper and lower portions that are slideably coupled to each other such that a distance between a first hook disposed on the lower portion and a second hook disposed on the upper portion can be adjusted. In one or more embodiments, the distance corresponds to at least one of a size or an orientation of the mobile device.

In one or more embodiments, a channel defined in the lower portion of the mobile device support body slideably receives a projection from the upper portion of the mobile device support body, the lower portion disposed between the upper portion and the stand. In one or more embodiments, a set screw forms the projection. In one or more embodiments, the telescoping support arm is releasably coupled to the telescoping stand. In one or more embodiments, the apparatus is collapsible from a deployed configuration to a stowed configuration, and when the apparatus is in the stowed configuration: the telescoping support arm is detached from the telescoping stand, and the telescoping stand and the telescoping support arm pivot inwardly such that the stand axis is substantially parallel to the base. In one or more embodiments, the mobile device support body is pivotably attached to the first end of the telescoping stand such that the mobile device support body can pivot towards or away from the telescoping stand, and when the apparatus is in the stowed position, the mobile device support body pivots towards the telescoping stand such that the mobile device support body is disposed against the telescoping stand.

In one or more embodiments, the mobile device support body is rotatably attached to the first end of the telescoping stand to allow the mobile device support body to be oriented towards or away from the user. In one or more embodiments, the base includes a stationary base plate and a moveable base plate, the moveable base plate is slideably coupled to the stationary base plate, and the telescoping stand and the telescoping support arm are pivotably attached to the moveable base plate. In one or more embodiments, the moveable base plate is slideably coupled to the telescoping stand to position the stand along the stand axis, whereby a portion of the telescoping stand can be adjustably disposed below a plane defined by a surface of the table.

Another aspect of the invention is directed to an apparatus for supporting a mobile device, comprising: a mobile device support body; a stand having first and second ends, the first end defining a recess to receive a portion of the mobile device support body, wherein a position of the mobile device support body is adjustable within the recess to set a height of the mobile device support body with respect to a user's field of vision; a base connected to the second end of the stand; and a clamp attached to the base, the clamp adapted to receive an edge of a working surface, wherein the base is adjustable relative to the clamp along an axis such that the base can adjustably move towards or away from the user while the clamp is disposed on the edge of the working surface.

In one or more embodiments, the stand is pivotably connected to the base to set a stand angle, the stand angle formed between a stand axis and the base, the stand axis extending between the first and second ends of the stand. In one or more embodiments, the stand is adjustable from a stowed configuration to a deployed configuration, the stand having a length from the first end to the second end, the length of the stand being substantially parallel to the base in the stowed configuration, and the length of said stand is disposed at an angle with respect to the base in the deployed configuration.

In one or more embodiments, the base includes a stationary base plate and a moveable base plate, the moveable base plate slideably coupled to the stationary base plate. In one or more embodiments, the mobile device support body is rotatably attached to the first end of the stand to allow the mobile device support body to be oriented towards or away from the user.

In one or more embodiments, the apparatus further comprises a support arm having a length between first and second ends of the support arm, the first end of the support arm mechanically coupled to the stand, the second end pivotably attached to the base, wherein the length of the support arm is adjustable to pivot the stand towards or away from the user. In one or more embodiments, a length of the stand between first and second ends of the stand is adjustable to set a height of the mobile device support body with respect to the user.

BRIEF DESCRIPTION OF THE DRAWINGS

For a fuller understanding of the nature and advantages of the present concepts, reference is made to the following detailed description of preferred embodiments and in connection with the accompanying drawings, in which.

DETAILED DESCRIPTION

An apparatus for supporting a mobile device is adjustable in multiple degrees of freedom to accommodate users of different heights and mobile devices of different sizes and orientations. The apparatus includes a mobile device support body, a base, a stand, a support arm, and a clamp. The mobile device support body is coupled to a first end of the stand. In some embodiments, the mobile device support body is rotatably and/or pivotably coupled to the first end of the stand. The length of the stand can be adjustable to set a height of the mobile device support body (and mobile device disposed thereon) with respect to the user, for example to align the mobile device with the user's field of vision.

The support arm is coupled to the stand. The length of the support arm can be adjusted to set an angle of the stand, for example to pivot the stand towards or away from the user.

The stand and the support arm are rotatably coupled to the base. The base can include a moveable portion and a stationary portion. The position of the moveable portion can be adjusted to move the apparatus towards or away from the user. Alternatively, the base can slideably engage the clamp to move the apparatus towards or away from the user.

The apparatus can be configured in a stowed configuration for increased portability. In the stowed configuration, the stand and the support arms pivot inwardly so they are disposed substantially parallel to the base. The mobile device support body can pivot towards the stand such that the mobile device support body is disposed against the stand.

It is understood that this disclosure is often drafted in the context of using the apparatus on a table, but the disclosure is not so limited, and can be applied to various contexts as would be appreciated by those skilled in the art with suitable modifications to the size and/or form factor of the device, without departing from the spirit of the disclosure. For example, the apparatus can be configured to use in a wheelchair, in a hospital setting, or at a desk.

Figure 1:
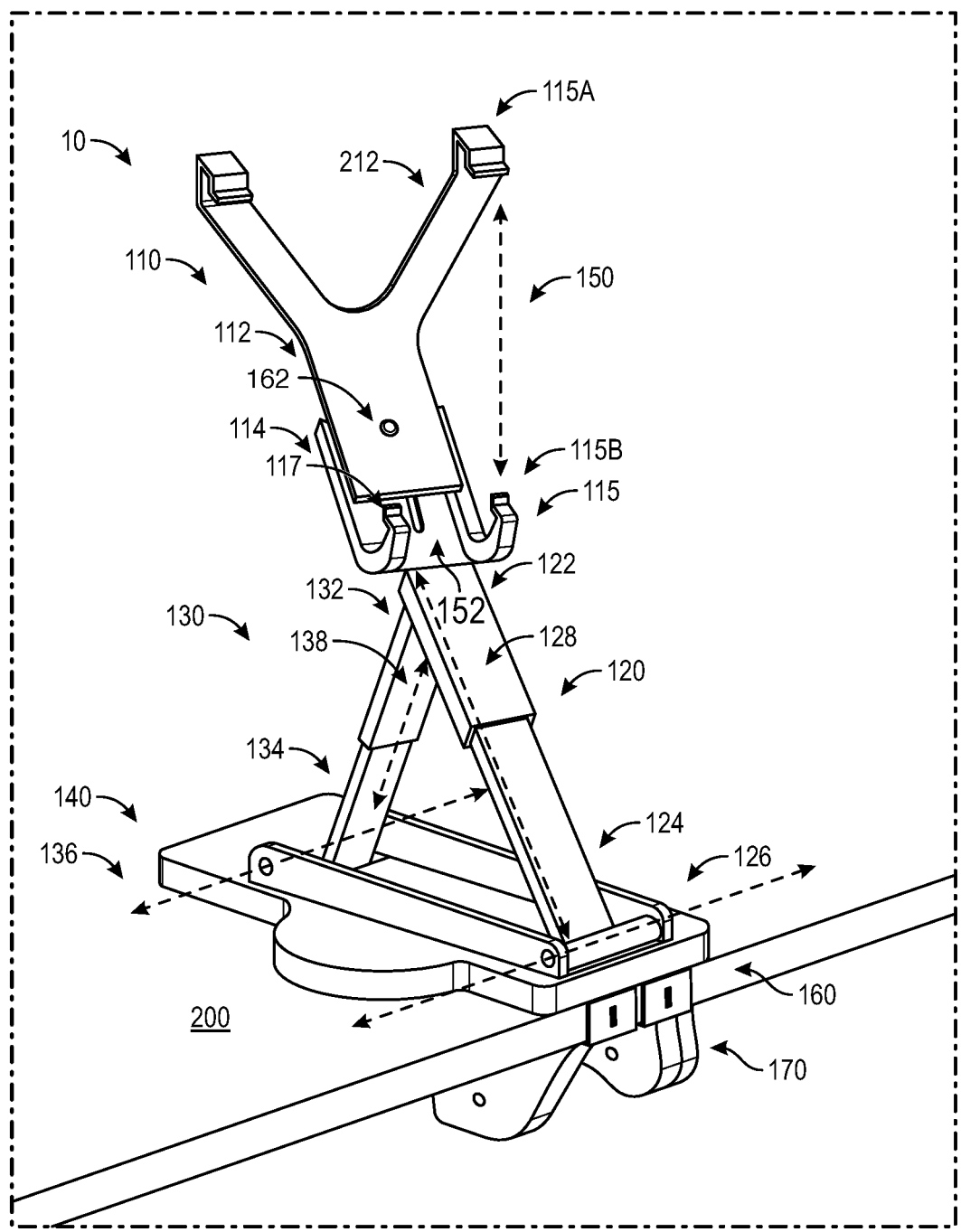
FIG. 1 is a perspective view of an apparatus for supporting a mobile device according to one or more embodiments.

FIG. 1 is a perspective view of an apparatus 10 for supporting a mobile device according to one or more embodiments. The apparatus 10 includes a mobile device support body 110, a stand 120, a support arm 130, and a base 140.

The mobile device support body 110 is configured and arranged to support a mobile device, such as a smartphone, a tablet, a netbook, a Chromebook, or other mobile device.

The mobile device support body 110 includes a plurality of hooks 115 to receive and secure the mobile device on the mobile device support body 110. In some embodiments, the hooks 115 can be adjusted outwardly or inwardly (e.g., towards or away from the mobile device support body 110) to accommodate mobile devices having different cross-sectional thicknesses. The hooks 115 can include a spring mechanism and/or they can be semi-rigid such that the hooks 115 engage and retain the mobile device on the holder 110. In addition or in the alternative, the hooks 115 can be rigid. In some embodiments, a pad can be disposed on an inner portion 117 of the hook 115 that engages the mobile device to prevent scratching and/or to increase the frictional grip on the mobile device.

The mobile device support body 110 includes an upper body portion 112 and a lower body portion 114 that are slideably connected to one another to increase or decrease the length of the mobile device support body 110. For example, the upper and lower body portions 112, 114 can be adjusted to increase or decrease a length 150 between a hook 115A on the upper body portion 112 and a hook 115B on the lower body portion 114.

The upper body portion 112 can include first and second arms 212 such that the upper body portion 112 is configured in a "Y" shape. This shape allows the hooks 115 on the upper body portion 112 to engage outer portions of the mobile device while the hooks 115 on the lower body portion 114 engage inner portions of the mobile device for more stable support of the mobile device.

The slideable connection can be formed by a channel 152 in the lower body portion 114 and a projection 162 from the upper portion that extends into the channel 152. The projection 162 can include a set screw (e.g., as illustrated in FIG. 1) or similar attachment mechanism, such as a wing nut. By loosening the set screw, the upper and lower body portions 112, 114 of mobile device support body 110 can move closer to one another to accommodate a mobile device having a smaller form factor, such as a smartphone. Such a narrowed position would also be appropriate for holding a larger mobile device in a horizontal or landscape orientation. Upper and lower portions of mobile device support body 110 can also move apart from one another to accommodate a mobile device having a larger form factor, such as a tablet. Such an open position would also be appropriate for holding a smaller mobile device in a vertical or portrait orientation.

The stand 120 includes first and second ends 122, 124. The first end 122 of the stand 120 is mechanically coupled to the mobile device support body 110, such as to the lower body portion 114. In some embodiments, the first end 122 of the stand 120 is rotatably coupled to the mobile device support body 110 to allow the mobile device support body 110 to rotate 600 such that the mobile device on the mobile device support body 110 can face towards or away from the user, for example as illustrated in FIG. 6. The second end 124 of the stand 120 is pivotably coupled to the base 140, allowing the stand 120 to pivot towards or away from the user. For example, the stand 120 can pivot about an axis 126 that extends through the pivot points on the second end 124 of the stand 120 and the base 140, where the axis 126 is parallel to the base 140. Pivoting the stand 120 adjusts an angle 220 (FIG. 2) of the stand 120 between (a) a stand axis 128 that extends between the first and second ends 122, 124 and (b) the base 140 (e.g., a plane defined by a top surface 142 of the base 140). The angle 220 can be pivoted from 0° to 90° in some embodiments. In the deployed configuration, as illustrated in FIGS. 1-7, the angle 220 is generally greater than 0°, such as between 30° and 90° in normal use.

In some embodiments, the stand 120 can telescope to adjust the length (e.g., to be longer or shorter) of the stand 120 with along a stand axis 128 that extends between the first and second ends 122, 124. The length and angle 220 of the stand 120 determine the height of the mobile device support body 110 (and mobile device supported thereon) with respect to the user. Thus, the user can adjust the length and angle 220 of the stand 120 so that a mobile device, disposed on the mobile device support body 110, is centered in the user's field of vision. This position may vary based on the user and the size of the device (e.g., it will be different for a smartphone than for a tablet). The angle 220 of the stand 120 can also be adjusted to reduce glare on the mobile device screen and/or to improve user comfort.

The support arm 130 extends from the base 140 to the stand 120. A first end 132 of the support arm 130 is releasably coupled to the stand 120. The releasable coupling allows the support arm 130 and the stand 120 to be disposed against the base 140 in a compact stowed configuration, as discussed below. The releasable coupling can include a male connection disposed on the support arm 130 and a female connection formed on the stand 120 (or vice versa) to allow the support arm 130 and the stand 120 to engage and disengage from each other.

A second end 134 of the support arm 130 is pivotably coupled to the base, allowing the support arm 130 to pivot towards or away from the stand 120. For example, the support arm 130 can pivot about an axis 136 that extends through the pivot points on the second end 134 of the support arm 130, where the axis 136 is parallel to the base 140 and to axis 126.

In some embodiments, the support arm 130 can telescope to adjust the length (e.g., to be longer or shorter) of the support arm 120 with respect to a support arm axis 138 that extends between the first and second ends 132, 134. The length of the support arm 130 and the angle 230 (FIG. 2) of the support arm 130 (the angle 230 determined with respect to the support arm axis 138 and the base 140) determine the angle 220 of the stand 120. Thus, the user can adjust the length and angle 230 of the support arm 130 so that a mobile device, disposed on the mobile device support body 110, is oriented at the desired angle. As discussed above, the angle 220 of the stand 120 can also be adjusted to reduce glare on the mobile device screen and/or to improve user comfort.

In some embodiments, the length of the stand 120 and/or the length of support arm 130 can be adjusted using a pin and hole or a ratcheting mechanism.

The base 140 includes a clamp 160 that receives the edge of a working surface, such as a table 200, to provide support and stability for the apparatus 10. For example, the clamp 160 allows the apparatus 10 to resist lateral movement when a user presses on a touch screen of a mobile device disposed on the mobile device support body 110. Rubberized feet 170 can be attached to the clamp 160 or to the base 140 to further secure the clamp 160 and base 140 to the table 200 (e.g., by increasing friction therebetween).

Figure 2:
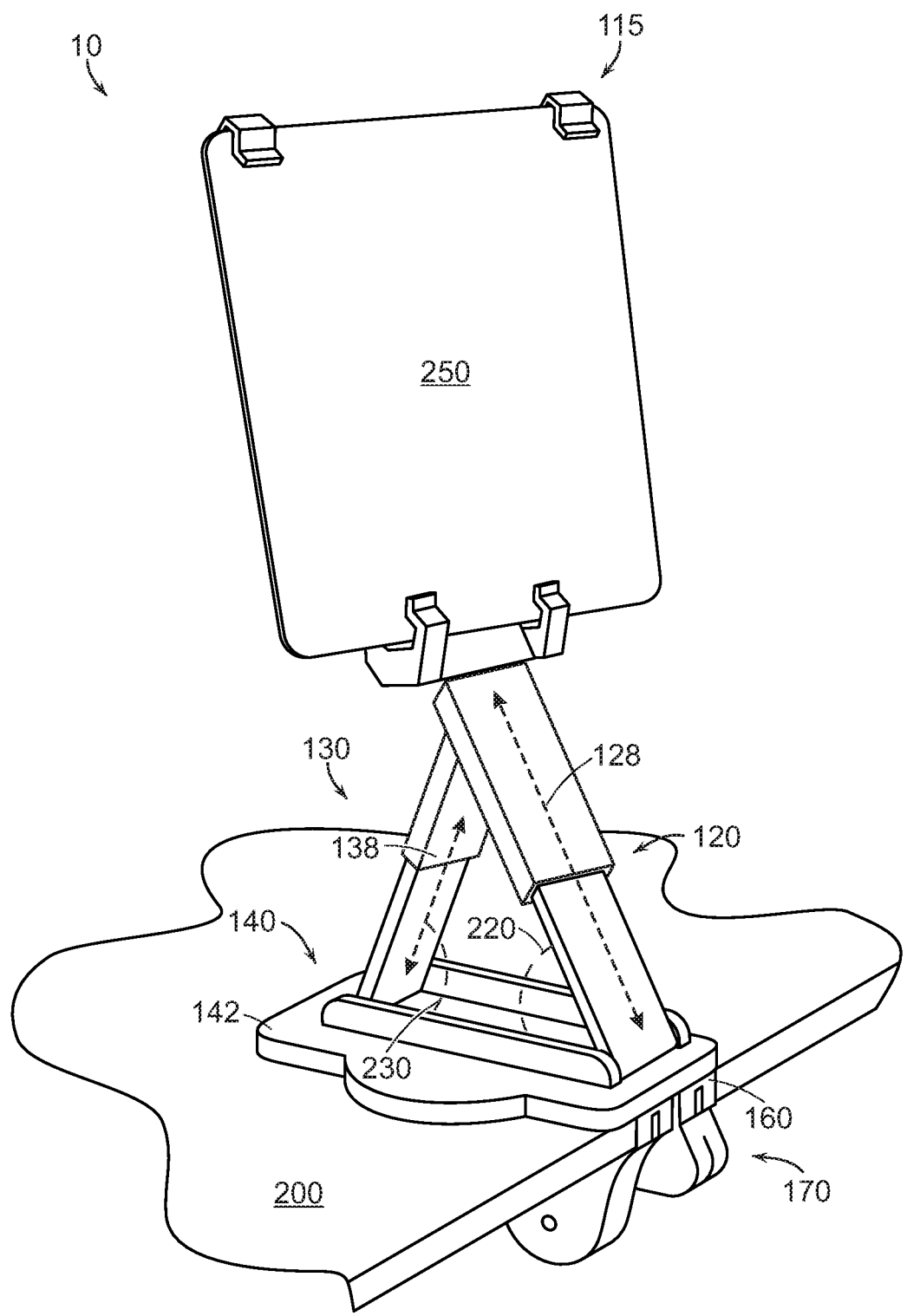
FIG. 2 illustrates the apparatus while holding a mobile device in a vertical or portrait orientation according to one or more embodiments.

FIG. 2 illustrates the apparatus 10 in the same configuration as illustrated in FIG. 1 while holding a mobile device 250 in a vertical or portrait orientation.

Figure 3:
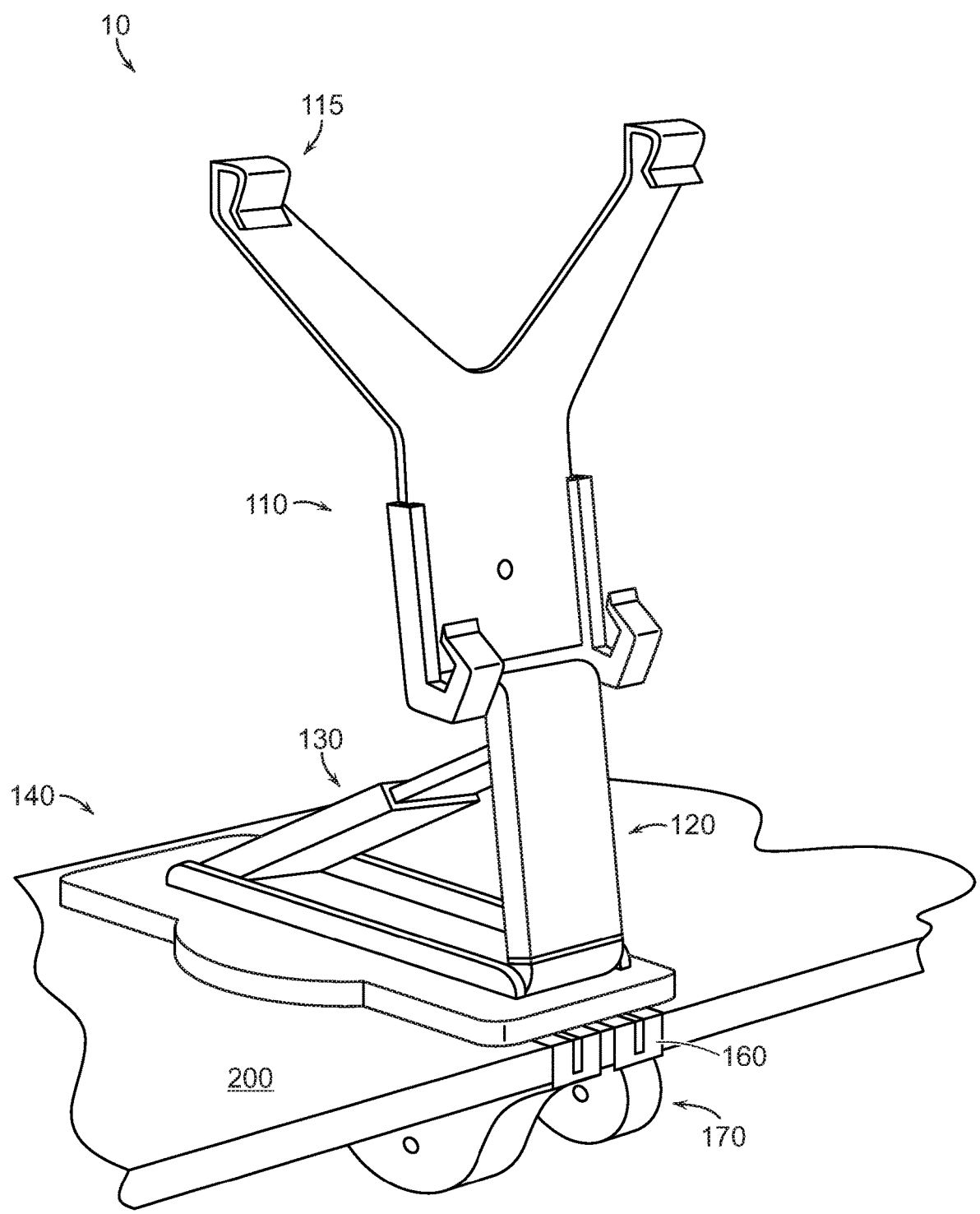
FIG. 3 illustrates the apparatus in a low and vertical configuration where the stand is adjusted to have a short length and the support arm is adjusted to have a long length according to one or more embodiments.

FIG. 3 illustrates the apparatus 10 in a low and vertical configuration where the stand 120 is adjusted to have a short length and the support arm 130 is adjusted to have a long length. The long length of support arm 130 corresponds to the vertical orientation of the apparatus 10. In the vertical orientation, the angle 220 of the stand 120 is at or near 90°. The short length of the stand 120 corresponds to a low height of the mobile device support body 110.

Figure 4:
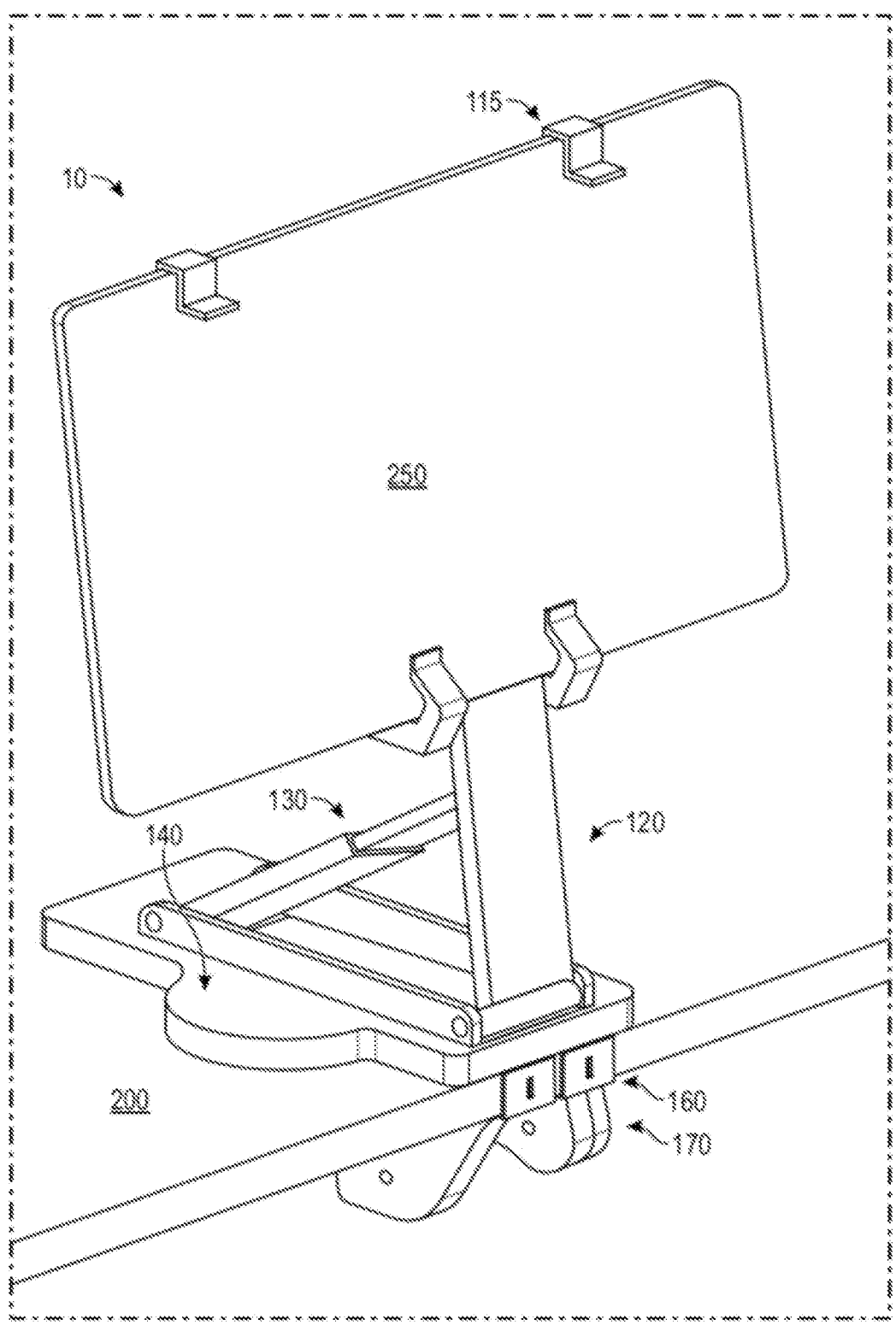
FIG. 4 illustrates the apparatus of FIG. 3 while holding a mobile device in a horizontal or landscape orientation according to one or more embodiments.

FIG. 4 illustrates the apparatus 10 in the same configuration as illustrated in FIG. 3 while holding the mobile device 250 in a horizontal or landscape orientation. As discussed above, different orientations (and sizes) of the mobile device (e.g. mobile device 250) can be accommodated by slideably adjusting the upper and lower body portions 112, 114 of the mobile device support body 110.

Figure 5:
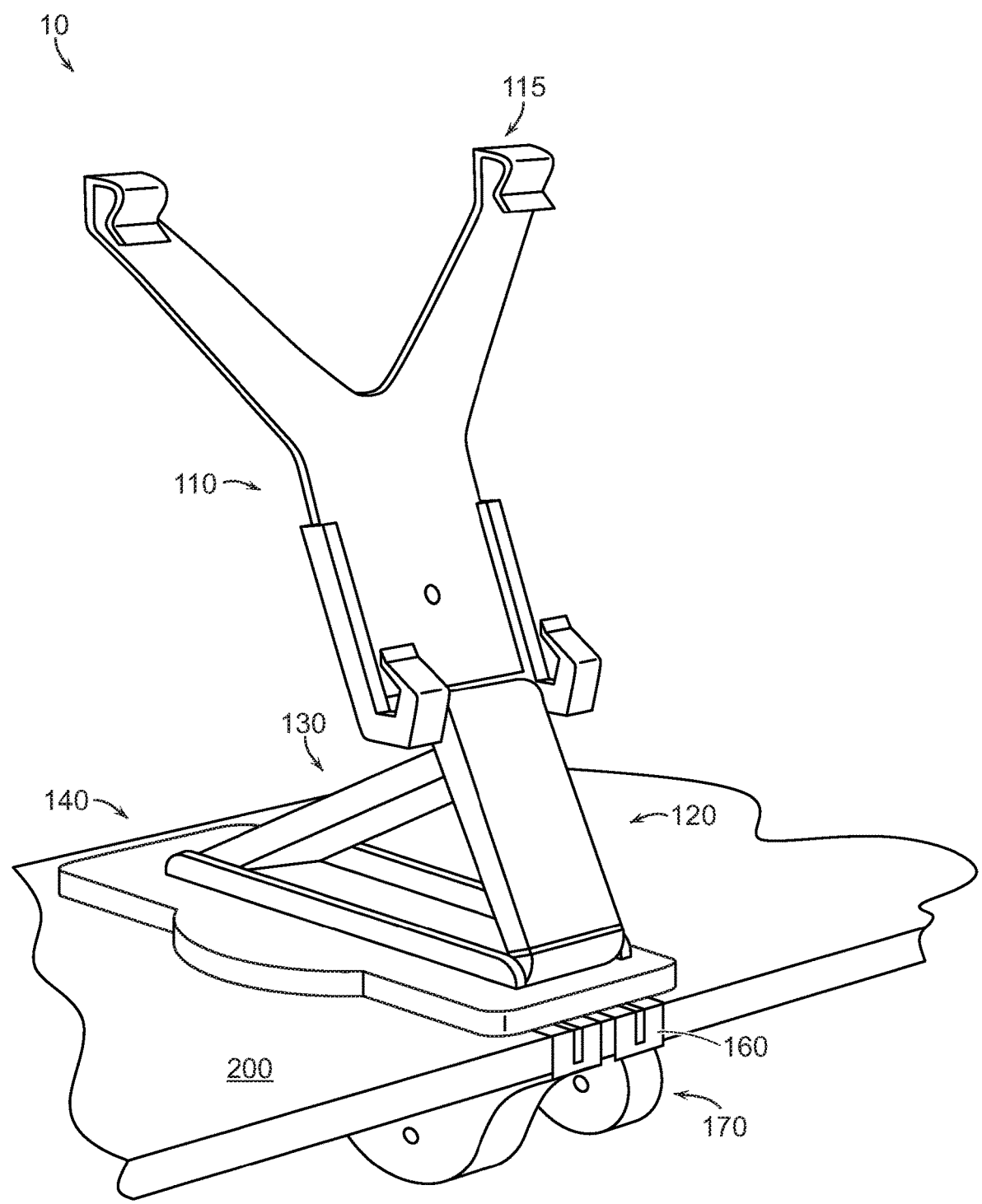
FIG. 5 illustrates the apparatus in a low and upwardly-angled configuration where both the stand and the support arm are adjusted to have a short length according to one or more embodiments.
Figure 6:
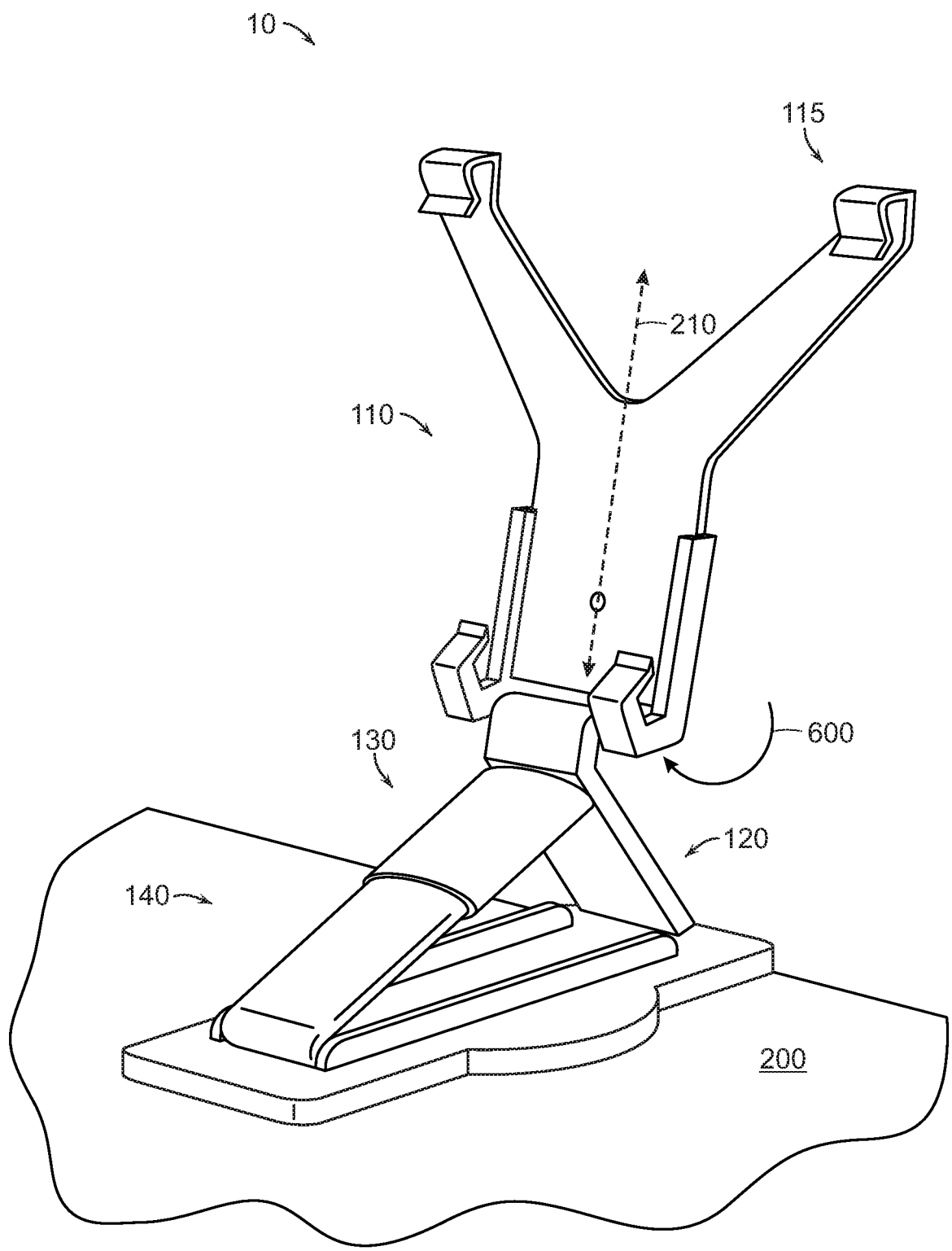
FIG. 6 is a rear perspective view of the apparatus in a first configuration according to one or more embodiments.

FIG. 5 illustrates the apparatus 10 in a low and upwardly-angled configuration where both the stand 120 and the support arm 130 are adjusted to have a short length. The short length of the support arm 130 corresponds to the upwardly-angled or reclined orientation of the apparatus 10 including of the upwardly-angled or reclined orientation of the mobile device support body 110.

FIG. 6 is a rear perspective view of the apparatus 10 in a first configuration. In FIG. 6, the mobile device support body 110 has been rotated 600 about a mobile device support body axis 210 so that the mobile device support body 110 is rearward facing. This configuration can be used to allow a second user sitting across the table to view the mobile device. The mobile device support body axis 210 extends in a longitudinal direction along the length or height of the mobile device support body 110.

Figure 7:
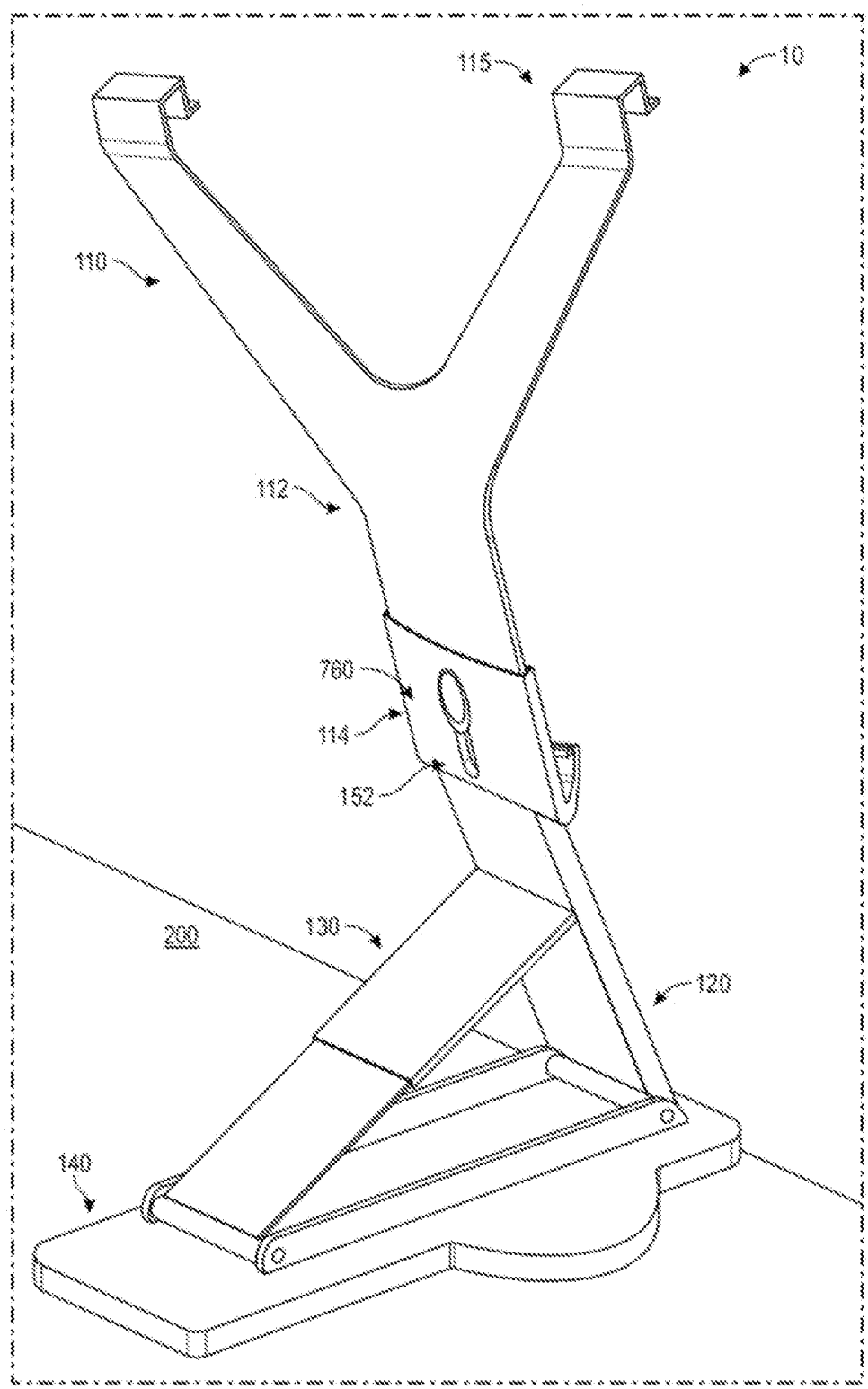
FIG. 7 is a rear perspective view of the apparatus in a second configuration according to one or more embodiments.

FIG. 7 is a rear perspective view of the apparatus 10 in a second configuration. In FIG. 7, the mobile device support body 110 is forward facing (i.e., the mobile device support body 110 has not been rotated 600) so that the back of the mobile device support body 110 is viewable. The channel 152 in the lower body portion 112 is viewable on the back of the mobile device support body 110. In addition, FIG. 7 illustrates a knob 760 for a set screw that extends through the channel. Adjusting the knob 760 tightens or loosens the set screw. When the set screw is tightened, the upper and lower body portions 112, 114 are compressed against each other, which sets the relative positions of the upper and lower body portions 112, 114. When the set screw is loosened, the upper body portion 112 can slide with respect to the lower body portion 114 to adjust the length 150 of the mobile device support body 110.

Figure 8:
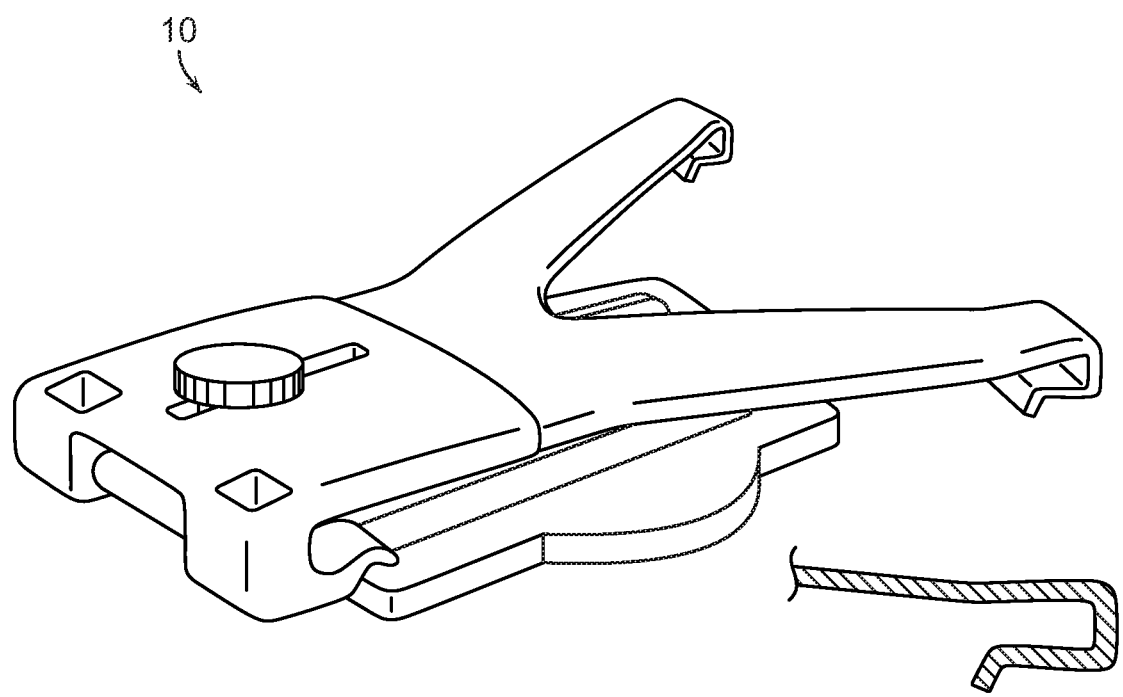
FIG. 8 is a perspective view of the apparatus in a stowed configuration according to one or more embodiments.

FIG. 8 illustrates the apparatus 10 in a stowed configuration. To transition from the deployed configuration (e.g., as illustrated in FIGS. 1-7) to the stowed configuration, the support arm 130 is disengaged from the stand 120, and the support arm 130 pivots inwardly so it is disposed against the base 140. Next, the stand 120 pivots inwardly so it is disposed against the support arm 130. In this position, the angle 220 of the stand 120 is at or near 0° (e.g., 0° to 10°). Then the mobile device support body 110 pivots upward so that it is disposed against the stand 120. In the stowed configuration, the support arm 130, the stand 120, and the mobile device support body 110 are substantially parallel to (e.g., within 10°) the base 140. The apparatus 10 is substantially smaller (e.g., in the vertical direction) in the stowed configuration, which is advantageous for portability (e.g., during travel).

As can be seen, the apparatus 10 is compact and adjustable with many degrees of freedom, and it allows the user to adjust the apparatus 10 so the mobile device is at eye level (e.g., in the middle of her field of vision). Viewing the mobile device at eye level can reduce stress on the user's neck and can reduce the adverse dermatological impact of looking down for extended periods of time, as discussed above.

An alternative embodiment of the apparatus is illustrated in FIGS. 9-14, which illustrate various perspectives of an apparatus 900. The apparatus 900 can be a personal support apparatus and/or a personal rest system. In addition or in the alternative, the apparatus 900 can be configured to support a mobile device, similar to apparatus 10.

Figure 10:
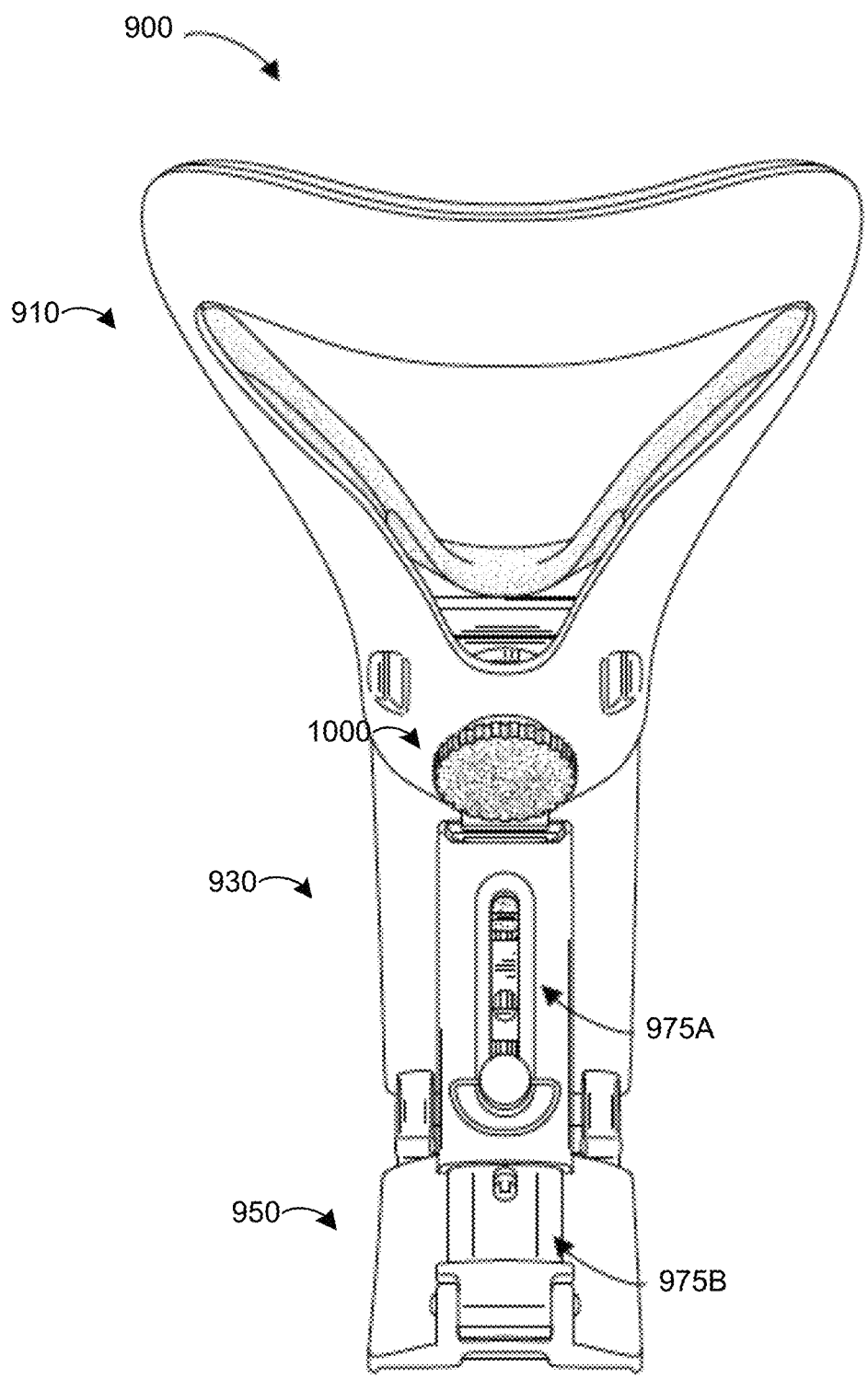
FIG. 10 is a rear view of the apparatus according to an alternative embodiment.
Figure 12:
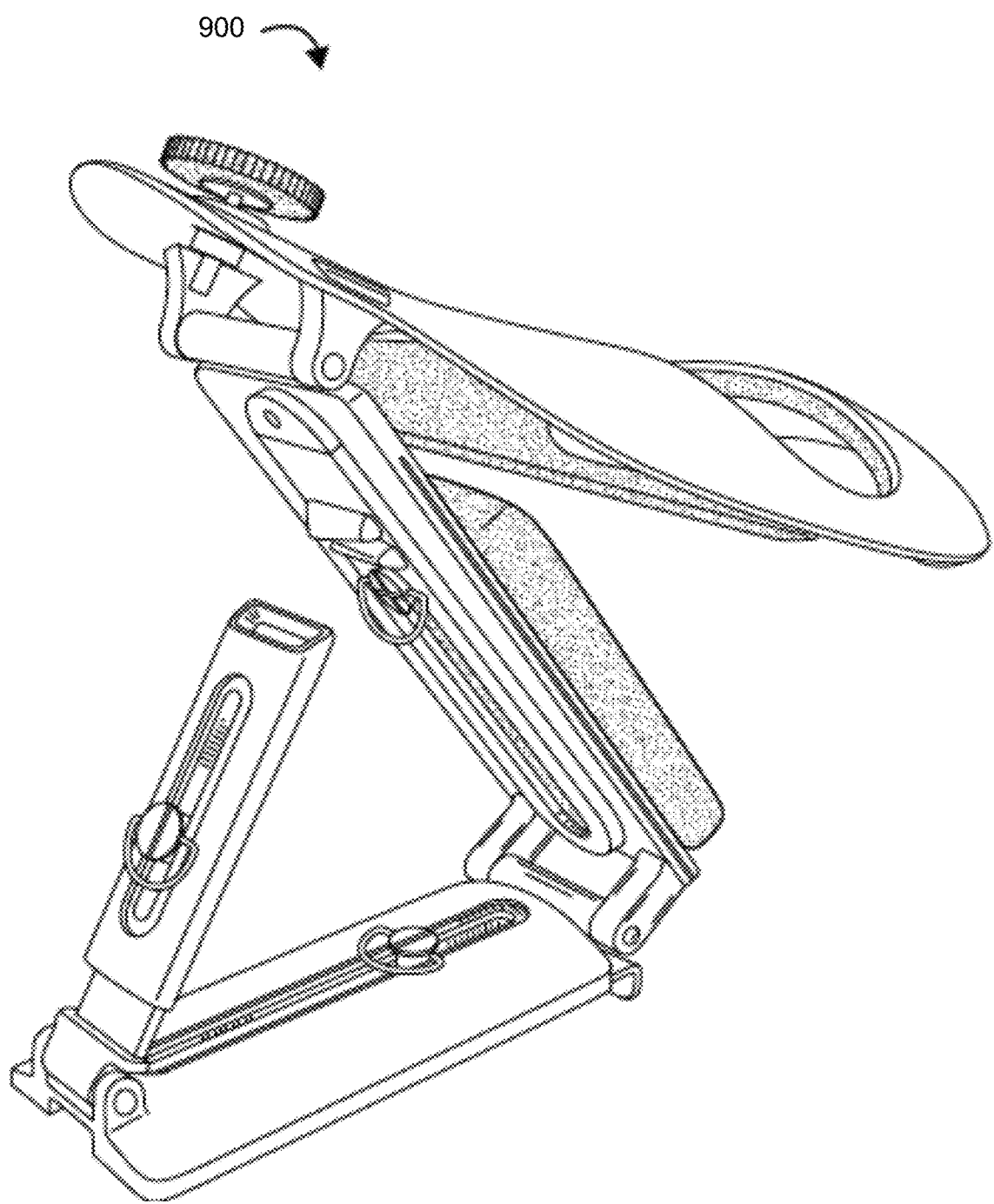
FIGS. 12, 13, and 14 are perspective views that illustrate the transition of the apparatus from a deployed configuration to a stowed configuration according to an alternative embodiment.
Figure 13:
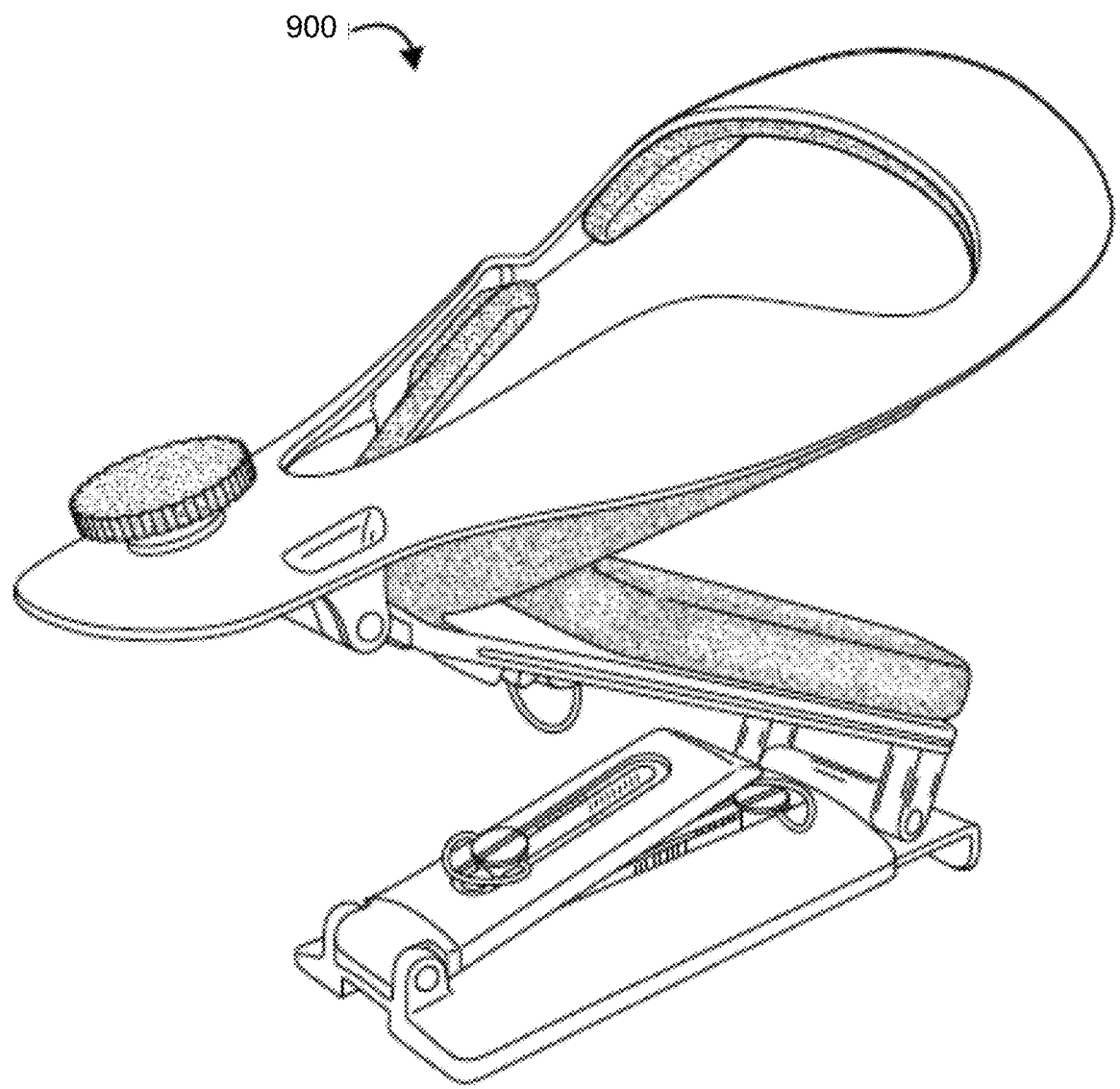
Figure 14:
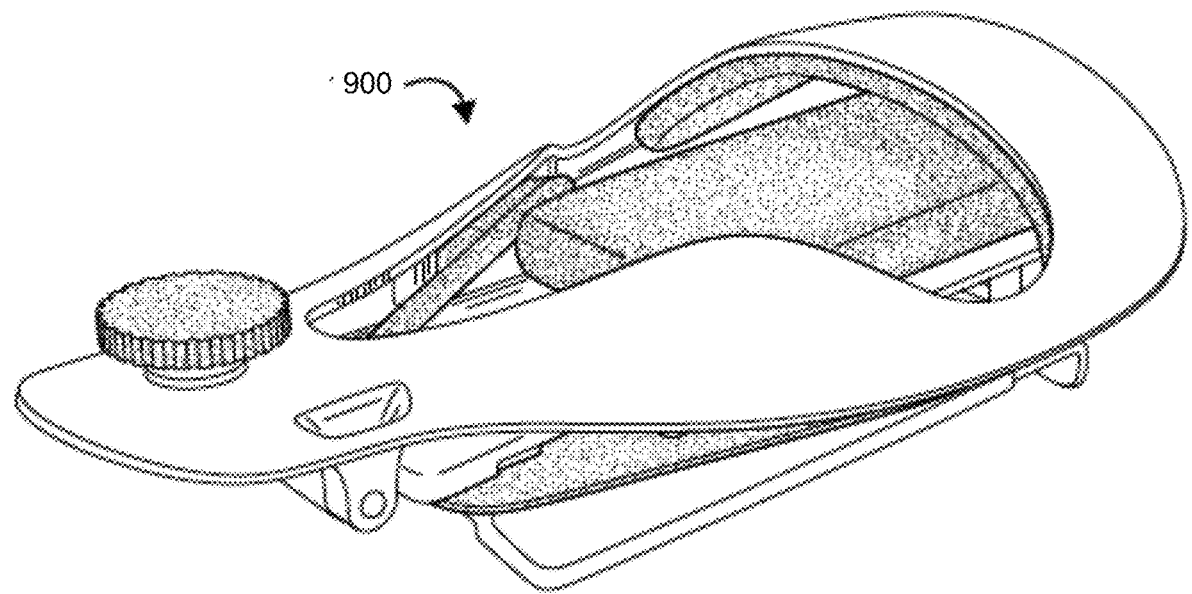

The apparatus 900 includes various adjustable components for customization in various degrees of freedom. The apparatus 900 includes a head support 910 having a frame. Pads 920A, 920B are mounted on the frame to support the user's face (e.g., chin and forehead). The frame is pivotably attached to a stand 930 at a pivot point 925 thus allowing the frame to fold towards the stand 930 for storage (e.g., as illustrated in FIGS. 12-14). The frame can also be pivoted forwards and backwards as desired by the user for comfort. The head support 910, pads 920A, 920B, and/or frame can include a receptacle for an aromatherapy cartridge in some embodiments. An adjustable set screw 1000 (e.g., as illustrated in FIG. 10) can be disposed in the head support 910 and the stand 930 to set or release the pivoting of the head support 910 with respect to the stand 930. For example, tightening the set screw 1000 fixes the pivot angle of the head support 910 while loosening the set screw 1000 allows the head support 910 to pivot freely.

An optional chest support 935 is attached to the stand 930. The chest support 935 can adjustably slide along an optional groove 940 for custom positioning of the chest support 935 at a desirable height for a user. The chest support 935 can lock at a desired position in the groove 940, for example with a pin, a ratcheting mechanism, or similar structure.

The stand 930 includes a first plate 945A and a second plate 945B. The plates 945A, 945B can slide with respect to each other to slideably adjust the length of the stand 930 (e.g., to increase or decrease the length). By adjusting the length of the stand 930, the apparatus 900 can be adjusted to a customized height (e.g., a longer stand 930 for a taller user), such as to set the height of the head support with respect to the user.

The stand 930 is mechanically connected to (e.g., pivotably connected to) an adjustable base 950. The base 950 defines a groove 955 for sliding a base plate 960 with respect to a clamp 965, which is configured to attach to a table or other working surface. By slideably adjusting the base 950, the chest support 935 and the head support 910 can be positioned towards or away from a user. A pin 1058 extends from the clamp 965 or the base plate 960 to slide/adjust the base plate 960 as described above.

Figure 11:
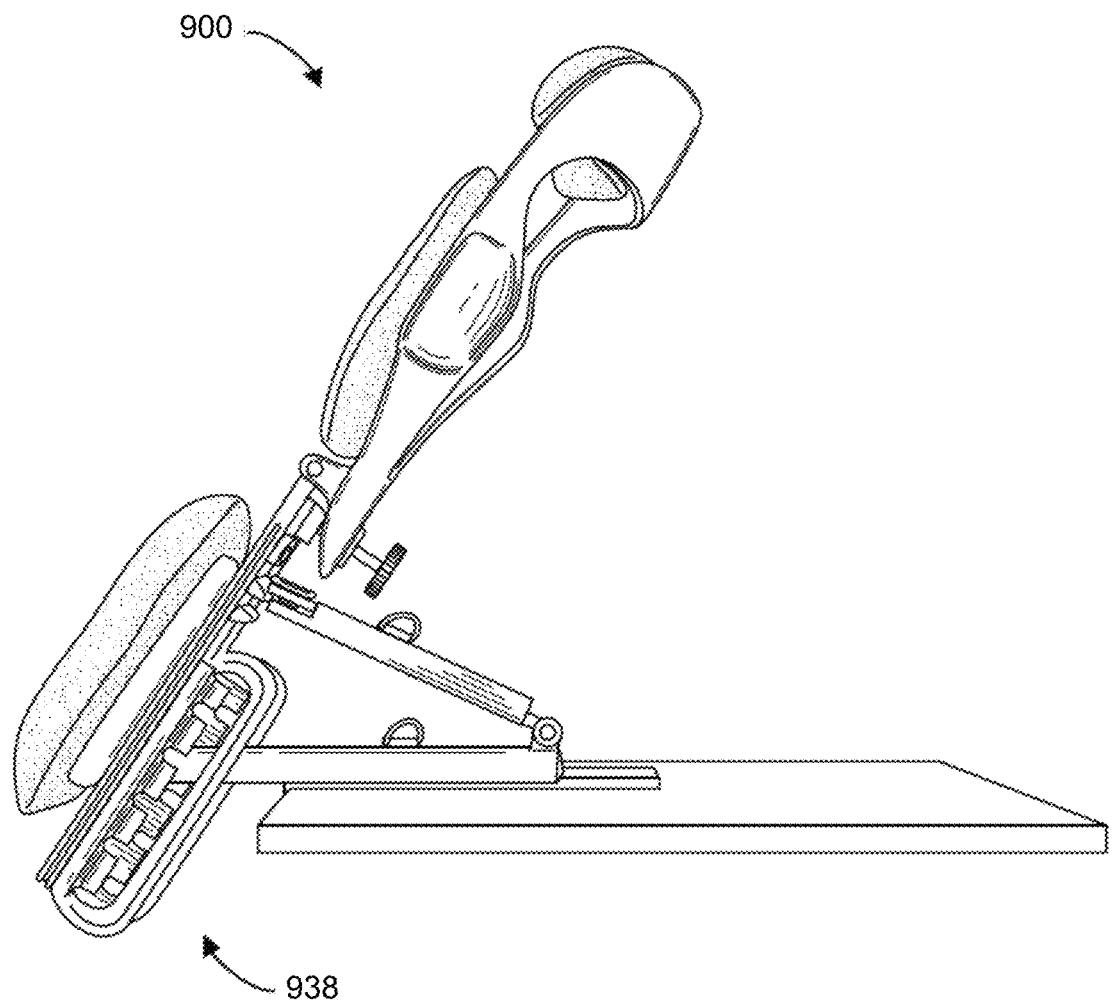
FIG. 11 is a side view of the apparatus according to an alternative embodiment.

In some embodiments, the base 950 can slide away from the clamp 1065 and the table/working surface (and towards the user). The base 950 can overhang the table/working surface to allow the stand 930 and/or chest support 1035 to slide (e.g., using saw tooth mechanism 938) below a plane defined by a top surface of the table or the working surface as illustrated in FIG. 11. Using this configuration, the apparatus 900 can accommodate a wide range of users while being placed on a table/working surface at various heights.

An adjustable support arm 970 extends between the base 950 and the stand 930 to provide mechanical support to the stand 930. The support arm 970 can lengthen or shorten by sliding respective support arm members 975A, 975B (e.g., as illustrated in FIG. 10), which causes the stand 930 and chest support 935 to pivot towards or away from the user. For example, lengthening the support arm 970 causes the stand 930 to pivot towards the user while shortening the support arm 970 causes the stand 930 to pivot away from the user. The support arm 970 can be detachably and pivotably coupled to the stand 930 with a quick release attachment mechanism, which can allow the apparatus 900 to be collapsed easily into a stowed configuration, as described below.

In some embodiments, a light source is integrated into or attached to the base 950 and/or the frame. A user can use the light source for reading, etc. while using the apparatus 900.

The apparatus 900 can collapse into a stowed configuration as illustrated in FIGS. 12-14. To collapse, the support arm 970 detaches from the stand 930, which allows the support arm 970 and stand 930 to pivot inwardly towards the base 950. In addition, the head support 910 pivots towards the stand 930. In the stowed configuration, the head support 1010, the support arm, the stand 1030, and the base 950 can be disposed substantially parallel to one other, as illustrated in FIG. 14. The apparatus 900 is substantially smaller (e.g., in the vertical direction) in the stowed configuration, which is advantageous for portability (e.g., during travel).

Figure 9:
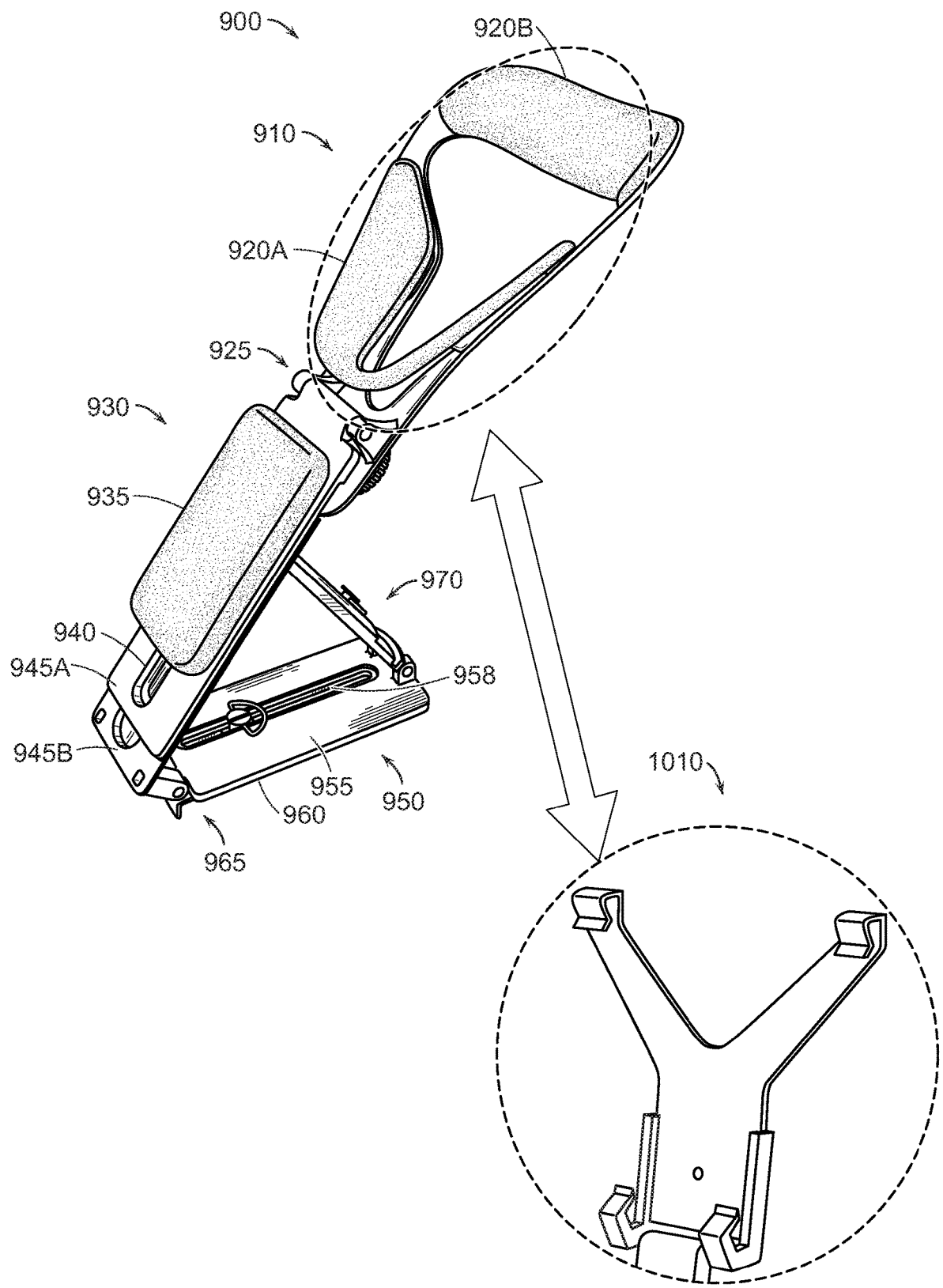
FIG. 9 is a perspective view of an apparatus according to an alternative embodiment.

As discussed above, the apparatus 900 can be configured as a mobile device stand. For example, the head support 910 can be replaced with (or interchanged with) a mobile device support 1010, as illustrated in FIG. 9. The mobile device support 1010 can include the mobile device support body 110 and hooks 115, discussed above. When the apparatus 900 includes the mobile device support 1010, the apparatus 900 does not include the optional chest support 935 or the optional groove 940, in some embodiments. In other embodiments, the optional chest support and the optional groove 940 can be included in the apparatus 900, and the head support 910 can be replaced with the mobile device support 1010 as needed by the user. One skilled in the art would understand that the apparatus 900 can be configured in these and in other configurations.

The mobile device support 1010 can be rotatably and/or pivotably coupled to the stand 930. Rotatably coupling the mobile device support 1010 to the stand 930 allows the user to rotate the mobile device support 1010 so that a mobile device disposed thereon can face towards or away from the user (e.g., towards a friend across the table from the user). Pivotably coupling the mobile device support 1010 to the stand 930 allows the user to adjust the mobile device support 1010 upwards or downwards (e.g., to reduce glare), and to configure the apparatus 900 in the stowed configuration, as discussed above.

This disclosure should not be considered limited to the particular embodiments described above. For example, one or more of the bodyrests and/or mobile device stands described herein can be adapted for a wheel chair, an arm chair, or other configuration. As a specific example, the bodyrest and/or mobile device stand can include elongated lower supports and/or legs that are configured to support the bodyrest/mobile device stand on the arms of a wheel chair and/or between the user's legs while positioning the bodyrest/mobile device stand at a height appropriate for the seated user. Similarly, the bodyrest/mobile device stand can be configured to rest on or attach to a table that lays across the arms of a wheel chair and/or on the user's lap. Additional modifications, equivalent processes, as well as numerous structures to which this disclosure may be applicable, will be readily apparent to those skilled in the art to which the present disclosure is directed upon review of the present disclosure.

What is claimed is:

1. An apparatus for supporting a mobile device, comprising:
    a mobile device support body;
    a stand having first and second ends, the first end attached to the mobile device support body;
    a base connected to the second end of the stand;
    a clamp attached to the base, the clamp adapted to receive an edge of a working surface; and
    a support arm having a length between first and second ends of the support arm, the first end of the support arm mechanically coupled to the stand, the second end of the support arm pivotably attached to the base, wherein the length of the support arm is adjustable to pivot the stand towards or away from a user,
    wherein the base is adjustable relative to the clamp along an axis such that the base can adjustably move towards or away from the user while the clamp is disposed on the edge of the working surface.

2. The apparatus of claim 1, wherein the stand is pivotably connected to the base to set a stand angle, the stand angle formed between a stand axis and the base, the stand axis extending between the first and second ends of the stand.

3. The apparatus of claim 2, wherein the stand is adjustable from a stowed configuration to a deployed configuration, the stand having a length from the first end to the second end, the length of the stand being substantially parallel to the base in the stowed configuration, and the length of said stand is disposed at an angle with respect to the base in the deployed configuration.

4. The apparatus of claim 1, wherein the mobile device support body is rotatably attached to the first end of the stand to allow the mobile device support body to be oriented towards or away from the user.

5. The apparatus of claim 1, wherein a length of the stand between first and second ends of the stand is adjustable to set a height of the mobile device support body with respect to the user.

6. The apparatus of claim 1, wherein the base is slideably coupled to the stand to position the stand along a stand axis, the stand axis extending between the first and second ends of the stand, whereby a portion of the stand can be adjustably disposed below a plane defined by the working surface.

7. The apparatus of claim 1, wherein the mobile device support body includes upper and lower portions that are slideably coupled to each other such that a distance between a first hook disposed on the lower portion and a second hook disposed on the upper portion can be adjusted.

8. An apparatus for supporting a mobile device, comprising:
    a mobile device support body;
    a stand having first and second ends, the first end attached to the mobile device support body;
    a base connected to the second end of the stand; and
    a clamp attached to the base, the clamp adapted to receive an edge of a working surface,
    wherein:
        the base is adjustable relative to the clamp along an axis such that the base can adjustably move towards or away from a user while the clamp is disposed on the edge of the working surface, and
        the base is slideably coupled to the stand to position the stand along a stand axis, the stand axis extending between the first and second ends of the stand, whereby a portion of the stand can be adjustably disposed below a plane defined by the working surface.

9. The apparatus of claim 8, wherein the stand is pivotably connected to the base to set a stand angle, the stand angle formed between a stand axis and the base, the stand axis extending between the first and second ends of the stand.

10. The apparatus of claim 9, wherein the stand is adjustable from a stowed configuration to a deployed configuration, the stand having a length from the first end to the second end, the length of the stand being substantially parallel to the base in the stowed configuration, and the length of said stand is disposed at an angle with respect to the base in the deployed configuration.

11. The apparatus of claim 8, wherein the mobile device support body is rotatably attached to the first end of the stand to allow the mobile device support body to be oriented towards or away from the user.

12. The apparatus of claim 8, further comprising a support arm having a length between first and second ends of the support arm, the first end of the support arm mechanically coupled to the stand, the second end pivotably attached to the base, wherein the length of the support arm is adjustable to pivot the stand towards or away from the user.

13. The apparatus of claim 8, wherein a length of the stand between first and second ends of the stand is adjustable to set a height of the mobile device support body with respect to the user.

14. The apparatus of claim 8, wherein the mobile device support body includes upper and lower portions that are slideably coupled to each other such that a distance between a first hook disposed on the lower portion and a second hook disposed on the upper portion can be adjusted.

* * * * *